(12) United States Patent
Liu et al.

(10) Patent No.: US 12,093,240 B2
(45) Date of Patent: Sep. 17, 2024

(54) METHOD, DEVICE, AND PROGRAM PRODUCT FOR MANAGING LOG DATA

(71) Applicant: Dell Products L.P., Round Rock, TX (US)

(72) Inventors: Xiao Liu, Shanghai (CN); Yingyan Zheng, Shanghai (CN); Junyi Zhang, Shanghai (CN); Yourong Alan Wang, Shanghai (CN); Xiaowei Luo, Shanghai (CN); Heng Liu, Langgongmiao Town (CN); Chunjuan Zhou, Chengdu (CN); Xiaoqin Liu, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/883,966

(22) Filed: Aug. 9, 2022

(65) Prior Publication Data
US 2023/0214377 A1    Jul. 6, 2023

(30) Foreign Application Priority Data

Dec. 30, 2021 (CN) .......................... 202111648695.0

(51) Int. Cl.
*G06F 16/23* (2019.01)
(52) U.S. Cl.
CPC ................ *G06F 16/2358* (2019.01)

(58) Field of Classification Search
CPC .................................................. G06F 16/2358
See application file for complete search history.

(56) References Cited

U.S. PATENT DOCUMENTS

| 8,452,761 | B2 | 5/2013 | Sabato et al. | |
|---|---|---|---|---|
| 9,542,255 | B2 | 1/2017 | Fu et al. | |
| 11,023,449 | B2 | 6/2021 | Chen et al. | |
| 11,200,132 | B1 | 12/2021 | Liu et al. | |
| 2009/0113246 | A1* | 4/2009 | Sabato ............... | G06F 11/0781 714/37 |
| 2015/0089309 | A1* | 3/2015 | Fu ...................... | G06F 11/0724 714/57 |
| 2015/0143182 | A1* | 5/2015 | Rajamanickam ... | G06F 11/0781 714/48 |

* cited by examiner

*Primary Examiner* — Apu M Mofiz
*Assistant Examiner* — Husam Turki Samara
(74) *Attorney, Agent, or Firm* — BainwoodHuang (57) ABSTRACT

Techniques manage log data. Such techniques involve receiving log data describing a state of an application system at a target time point. Such techniques further involve determining whether a level of the log data satisfies a predetermined level. Such techniques further involve, in response to determining that the level of the log data satisfies the predetermined level, storing log data within a predetermined range adjacent to the target time point to a log repository of the application system, the predetermined range indicating the amount of log data expected to be stored.

19 Claims, 7 Drawing Sheets

METHOD, DEVICE, AND PROGRAM PRODUCT FOR MANAGING LOG DATA

CROSS-REFERENCE TO RELATED APPLICATION

This application claims priority to Chinese Patent Application No. CN202111648695.0, on file at the China National Intellectual Property Administration (CNIPA), having a filing date of Dec. 30, 2021, and having "METHOD, DEVICE, AND PROGRAM PRODUCT FOR MANAGING LOG DATA" as a title, the contents and teachings of which are herein incorporated by reference in their entirety.

TECHNICAL FIELD

Implementations of the present disclosure relate to log management, and more particularly, to a method, a device, and a computer program product for managing log data of an application system.

BACKGROUND

With the development of computer technologies, various types of application systems, such as storage systems, computing systems, and communication systems, have appeared at present. In order to monitor the running state of an application system, log data can be generated for the application system. Log data can be stored for detecting exceptions of the application system, and so on. It will be appreciated that a large amount of log data may be generated during the running of the application system. On the one hand, storing log data will take up a lot of storage space. On the other hand, when searching for log data associated with a specific exception, the searching has to be done in massive log data. At this point, how to manage log data in a more effective way has become a hotspot of research.

SUMMARY OF THE INVENTION

Thus, it is expected to develop and implement a technical solution for managing log data in a more effective manner. It is expected that this technical solution can be compatible with existing log management methods and can manage log data without updating the hardware configuration of an application system.

According to a first aspect of the present disclosure, a method for processing log data is provided. In the method, log data describing the state of an application system at a target time point is received. It is determined whether the level of the log data satisfies a predetermined level. In response to determining that the level of the log data satisfies the predetermined level, log data within a predetermined range adjacent to the target time point is stored to a log repository of the application system, the predetermined range indicating the amount of log data expected to be stored.

According to a second aspect of the present disclosure, an electronic device is provided, including: at least one processor; and a memory coupled to the at least one processor and having instructions stored therein, wherein the instructions, when executed by the at least one processor, cause the device to perform actions. The actions are used for performing the method according to the first aspect of the present disclosure.

According to a third aspect of the present disclosure, a computer program product is provided. The computer program product is tangibly stored on a non-transitory computer-readable medium and including machine-executable instructions, and the machine-executable instructions are used for performing the method according to the first aspect of the present disclosure.

BRIEF DESCRIPTION OF THE DRAWINGS

In combination with the accompanying drawings and with reference to the following detailed description, the features, advantages, and other aspects of implementations of the present disclosure will become more apparent, and several implementations of the present disclosure are illustrated here by way of examples rather than limitation. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred implementations of the present disclosure will be described in more detail below with reference to the accompanying drawings. Although preferred implementations of the present disclosure are illustrated in the accompanying drawings, it should be understood that the present disclosure may be implemented in various forms and should not be limited by the implementations illustrated herein.

Instead, these implementations are provided in order to make the present disclosure more thorough and complete, and to fully convey the scope of the present disclosure to those skilled in the art.

The term "include" used herein and variants thereof indicate open-ended inclusion, that is, "including but not limited to." Unless otherwise stated, the term "or" means "and/or." The term "based on" denotes "at least partially based on." The terms "one example implementation" and "one implementation" mean "at least one example implementation." The term "another implementation" means "at least one additional implementation." The terms "first," "second," and the like may refer to different or the same objects. Other explicit and implicit definitions may also be included below.

Figure 1:
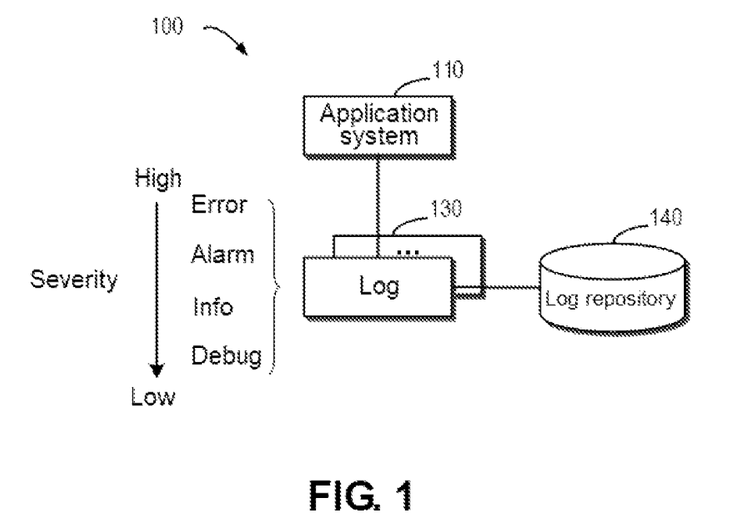
FIG. 1 schematically illustrates a block diagram for managing logs of an application system in which example implementations of the present disclosure may be implemented.

For ease of description, an application environment in which log data is managed will be first described with reference to FIG. 1. FIG. 1 schematically illustrates block diagram 100 for managing logs of an application system in which example implementations of the present disclosure may be implemented. As shown in FIG. 1, the state of application system 110 may be continuously monitored, and logs 130 at multiple time points may be generated. The speed at which logs 130 are generated may vary with the type of application system 110. For example, assuming that the time cycle of operations in a certain application system is short, logs 130 can be generated at a high speed; Assuming that the time cycle of operations in the certain application system is long, logs 130 may be generated at a low speed.

According to different states of application system 110, logs 130 can be divided into different levels. For example, logs 130 can be divided into the following types in a descending order of severities of exceptions in application system 110: error, which indicates that there is an event in application system 110 that may seriously affect the health condition of the application system; alarm, which indicates that there is an event in application system 110 that may affect the health condition of the application system; info, which indicates the normal running state of application system 110; and debug, which indicates information used to track more debugging states of application system 110. Generated logs 130 may be stored to log repository 140 to store log data in a persistent manner.

It will be understood that the above-mentioned types are merely illustrative, and according to an example implementation of the present disclosure, logs 130 may be divided into more or fewer types. For example, types of the logs can include: urgency, error, alarm, info, and debug. Generally speaking, with the running of application system 110, the total amount of log data will become larger and larger, which leads to a continuous increase in various resources involved in storing and managing log data. Therefore, it is expected to manage log data in a more effective way.

Technical solutions for reducing the data volume of logs have been proposed at present. In one technical solution, the frequency of generating logs 130 may be reduced. For example, the frequency of generating logs 130 is reduced from 2 times per second to 1 time per second, which can reduce the data volume of logs by half. However, the decrease in the frequency results in a decrease in the accuracy of logs 130, which is not conducive to maintaining the normal running of application system 110. In another technical solution, only logs with a severity higher than a predetermined level (i.e., logs associated with exceptional states) may be stored. For example, only data of the "error" level and "alarm" level may be stored, which leads to incomplete and discontinuous log data. However, such log data will increase the difficulty of fault diagnosis, which is not conducive to maintaining the healthy running of application system 110.

In order to at least partially solve the above problems, according to an example implementation of the present disclosure, a technical solution for managing log data is proposed. According to an example implementation of the present disclosure, log data (including log data of all levels) of application system 110 may be continuously received and cached, and when it is found that the log data involves an exception (e.g., higher than a predetermined level), logs within a predetermined range adjacent to the time point at which the exception occurs in application system 110 are stored in log repository 140. With an example implementation of the present disclosure, only logs associated with exceptions (e.g., logs within a predetermined range before and/or after exceptions) may be written to log repository 140. If application system 110 is in a normal state for a long time (i.e., levels of the logs are lower than a predetermined level), it is not necessary to write log data about the normal state to log repository 140.

It will be understood that "predetermined adjacent range" here may include at least any of the following: a predetermined range before a time point at which an exception occurs and a predetermined range after the time point. In this way, on the one hand, the amount of log data written to log repository 140 can be reduced, and on the other hand, it can be ensured that the written log data can fully reflect the state of application system 110 before, at, and/or after exceptions. In this way, it is convenient to find out an exception cause of application system 110 and then perform repair.

Figure 2:
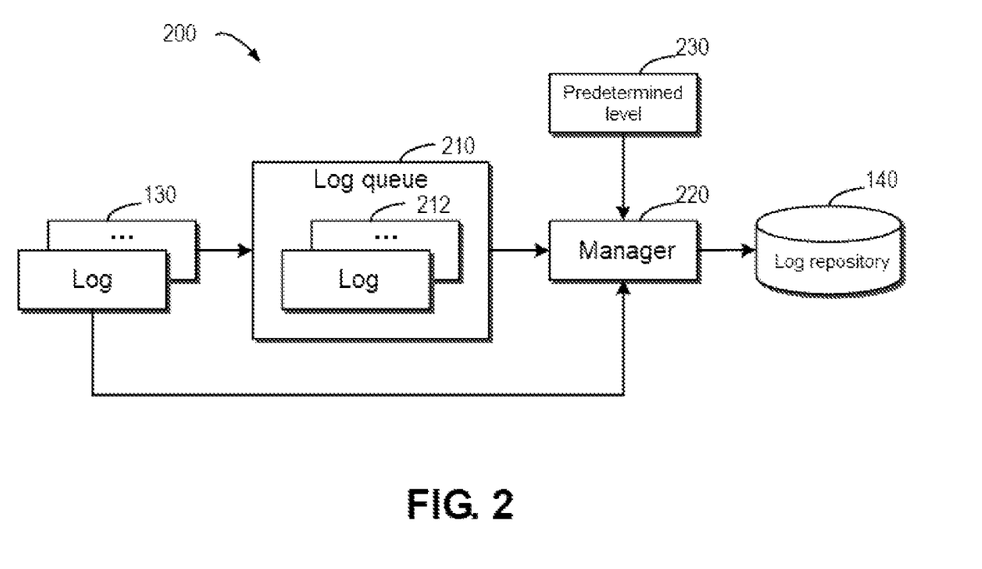
FIG. 2 schematically shows a block diagram for managing logs of an application system according to an example implementation of the present disclosure.

First, an outline of an example implementation of the present disclosure will be described with reference to FIG. 2. FIG. 2 schematically illustrates block diagram 200 for managing logs 130 of application system 110 according to an example implementation of the present disclosure. As shown in FIG. 2, with the running of application system 110, logs 130 may be continuously generated, and at this time, logs 130 may be logs in a log data stream for continuously monitoring the state of application system 110. Logs 130 may be cached using log queue 210. For example, log queue 210 may cache multiple logs generated at different time points in a first-in-first-out manner. The size of log queue 210 may be set to be equal to a predetermined range in order to store a desired capacity of log data.

According to an example implementation of the present disclosure, the predetermined range may be expressed based on various ways. For example, the predetermined range may be expressed based on at least any of the following: a predetermined time interval, a predetermined number of logs, and a predetermined capacity for log data. Specifically, the predetermined range may be expressed based on predetermined time interval $\Delta T$. Assuming that the current time point is T_now, then $\Delta T$ means that log data generated before the current time point (i.e., the time period between time points $T_{now}-\Delta T$ and T_now) is expected to be cached. For example, it can be set that $\Delta T=30$ seconds (or other values). At this point, the content in log queue 210 can be continuously updated as the current time changes. For example, one or more pieces of log data generated in time period $\Delta T$ before the current time point may be stored in a sliding window manner. It will be appreciated that the number of logs in log queue 210 at this time will depend on the speed at which log data is generated. The higher the generation speed is, the larger the length of log queue 210 is, and the lower the generation speed is, the smaller the length of log queue 210 is.

According to an example implementation of the present disclosure, the predetermined range may be represented based on predetermined number N of logs. For example, the length of log queue 210 may be set to predetermined number N (e.g., N=100 or other values). At this time, the content in log queue 210 can be continuously updated as the current time changes. For example, N pieces of log data before the current time point are stored in a sliding window manner.

According to an example implementation of the present disclosure, the predetermined range may be represented based on a predetermined capacity. For example, the size of log queue 210 may be set to a predetermined capacity, such as 100 k (or other values). At this point, the content in log queue 210 can be continuously updated as the current time changes. Assuming that the size of each log data is 1 k, then log queue 210 may store 100 (100 k/1 k=100) pieces of log data before the current time point in a sliding window manner.

For convenience of description, more details of managing log data based on log queue 210 will be described below by taking only a predetermined time interval as an example. According to an example implementation of the present disclosure, the value of the predetermined range can be determined based on various ways. For time interval ΔT, time interval ΔT can be set, for example, based on the speed at which the application system generates log data. Assuming that the generation speed is high, a large amount of log data will be generated in a unit time length. In this case, time interval ΔT can be set to a small value. Assuming that the generation speed is low, a small amount of log data will be generated in a unit time length. In this case, time interval ΔT can be set to a large value.

According to an example implementation of the present disclosure, time interval ΔT may be set based on the time cycle of operations in application system 110. Assuming that the operation cycle is long, it will take a long time to complete an operation in application system 110. At this time, in order to completely monitor various information associated with one operation, time interval ΔT can be set to a large value. Assuming that the operation cycle is short, it will only take a short time to complete an operation. In this case, time interval ΔT can be set to a small value. According to an example implementation of the present disclosure, time interval ΔT may be set based on the capacity of log repository 140. Assuming that the capacity is large, log repository 140 can store a large amount of log data. In this case, time interval ΔT can be set to a large value. Assuming that the capacity is small, time interval ΔT can be set to a small value. Specific details of log queue 210 for caching logs have been described above. Hereinafter, how to manage logs 130 based on log queue 210 will be described. As shown in FIG. 2, as time goes by, log queue 210 may store logs 212 within ΔT before the current time point in a sliding window manner. Predetermined level 230 may be set, and predetermined level 230 indicates a threshold level that triggers writing of log data to log repository 140. In other words, only when it is detected that the level of the current log data satisfies (higher than or equal to) predetermined level 230, the current log data and cached log data are stored in log repository 140.

According to an example implementation of the present disclosure, predetermined level 230 may be set to any one of error, alarm, info, and debug. For example, predetermined level 230 may be set to "alarm." The level of received log data (e.g., log data "A") may be compared with predetermined level 230 by manager 220, and it is determined whether to store the corresponding log data to log repository 140. When manager 220 detects that the level of log data "A" is higher than or equal to "alarm," it stores log data "A" and log data within ΔT before the time point (e.g., "T_A") of log data "A" to log repository 140. In this way, there is no need to always write log data of low levels (for example, "info" and "debug") to log repository 140, so the storage space of log repository 140 can be saved.

Further, manager 220 may also store data within a predetermined range (e.g., time interval ΔT) after time point "T_A" to log repository 140. It will be appreciated that logs 130 here are a log data stream used to continuously monitor the running state of application system 110. After the target time point, new log data will come gradually over time. At this time, manager 220 may write new log data within ΔT after time point "T_A" to log repository 140. If no new log data with a level higher than predetermined level 230 appears within ΔT after time point "T_A," the processing on log data "A" ends. At this point, the logs at time point "T_A" and in time intervals ΔT before and after time point "T_A" (i.e., T_A− to T_A+ΔT) are written to log repository 140.

According to an example implementation of the present disclosure, if new log data with a level higher than predetermined level 230 reappears within ΔT after time point "T_A," the new log data may be processed as another piece of log data to be processed. For example, method 300 described above may be performed on this new log data.

With an example implementation of the present disclosure, only log data whose level satisfies predetermined level 230 and log data within a predetermined range before (and/or after) the log data may be stored to log repository 140. In this manner, log data in log repository 140 includes log data of all levels at, before, and/or after exceptions. Compared with only retaining log data with high levels in existing technical solutions, retaining log data of all levels related to exceptional log data can retain more details of application system 110, thereby providing more bases for fault diagnosis and recovery.

Figure 3:
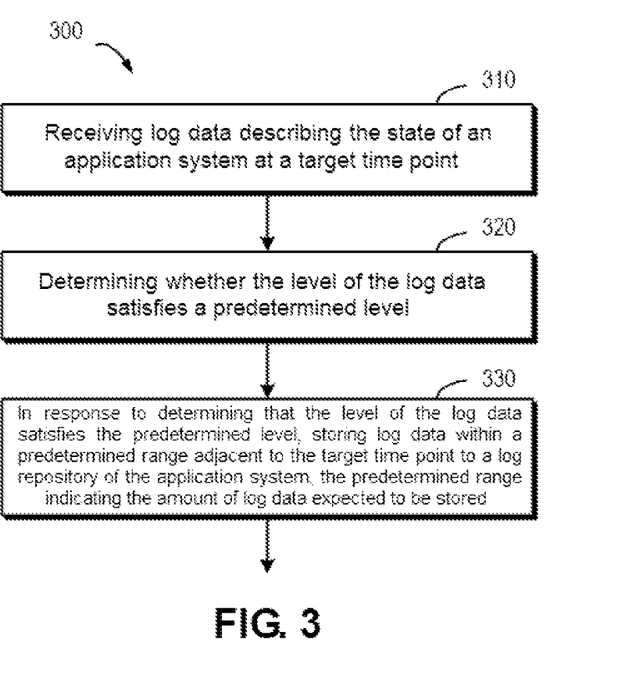
FIG. 3 schematically illustrates a flow chart of a method for managing logs according to an example implementation of the present disclosure.

Hereinafter, more details of an example implementation according to the present disclosure will be described with reference to FIG. 3. FIG. 3 schematically illustrates a flow chart of method 300 for managing logs according to an example implementation of the present disclosure. At block 310, log data describing the state of application system 110 at a target time point is received. It will be appreciated that the log data here may be log data in a log data stream used to continuously monitor the state of application system 110. More details about a log data stream are described with reference to FIG. 4.

Figure 4:
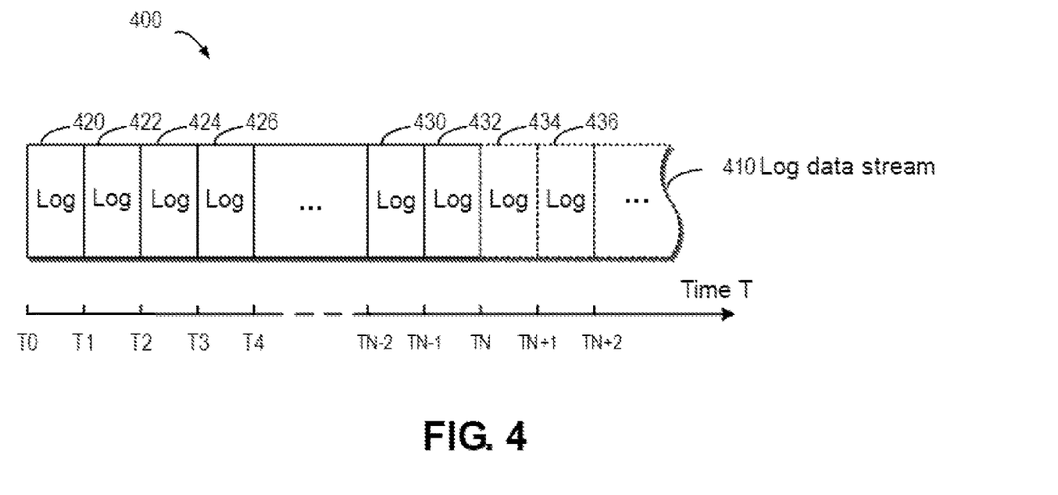
FIG. 4 schematically shows a block diagram of a log data stream according to an example implementation of the present disclosure.

FIG. 4 schematically shows block diagram 400 of a log data stream according to an example implementation of the present disclosure. As shown in FIG. 4, log data stream 410 may include a large number of logs collected at different time points. For example, according to the frequency of generating logs, logs 420, 422, 424, and 426 may be generated respectively at time points T0 to T3, and one log may be generated at each subsequent time point. For example, logs 430 and 432 may be generated respectively at time points TN−2 and TN−1, and logs 434, 436, and the like may be generated respectively at future time points TN and TN+1, and the like. As the volume of data is updated, newly generated logs can be continuously processed. For example, log 432 may be processed at time point TN−1. With an example implementation of the present disclosure, each log generated in real time can be continuously processed, thereby accurately recording all types of log data related to exceptional states.

Returning to FIG. 3, at block 320, it may be determined whether the level of the log data satisfies predetermined level 230. According to an example implementation of the present disclosure, an administrator of application system 110 may specify a desired level. After predetermined level 230 has been specified, only log data whose level satisfies predetermined level 230 may be stored to log repository 140. According to an example implementation of the present disclosure, "satisfy" may mean "greater than or equal to." According to another example implementation of the present disclosure, "satisfy" may mean "greater than."

Still referring to FIG. 3, at block 330, in response to determining that the level of the log data satisfies predetermined level 230, log data within a predetermined range adjacent to the target time point is stored to log repository 140 of application system 110. Here, the predetermined range may be expressed as time interval ΔT to indicate the amount of log data expected to be stored. According to an example implementation of the present disclosure, log data within the predetermined range before the target time point may be cached in a designated storage space (e.g., log queue 210).

In order to facilitate management of the cached log data, log queue 210 may be used for storing at least one piece of log data in chronological order. According to an example implementation of the present disclosure, the capacity of log queue 210 is not lower than the predetermined range. For example, the capacity of log queue 210 may be set to be equal to the predetermined range in order to accommodate all log data within the predetermined range and expected to be stored. Continuing the above example, log queue 210 should accommodate at least all logs generated within time interval T. Assuming that one log is generated per time unit and ΔT is set to 2 time units, then the length of the log queue can be set to 2. More details about log queue 210 are described with reference to FIG. 5. It will be appreciated that the length of the log queue above is merely illustrative. According to an example implementation of the present disclosure, the length of the log queue may not be limited. Alternatively and/or additionally, the length of the log queue may be set to log generation speed×predetermined time range.

Figure 5:
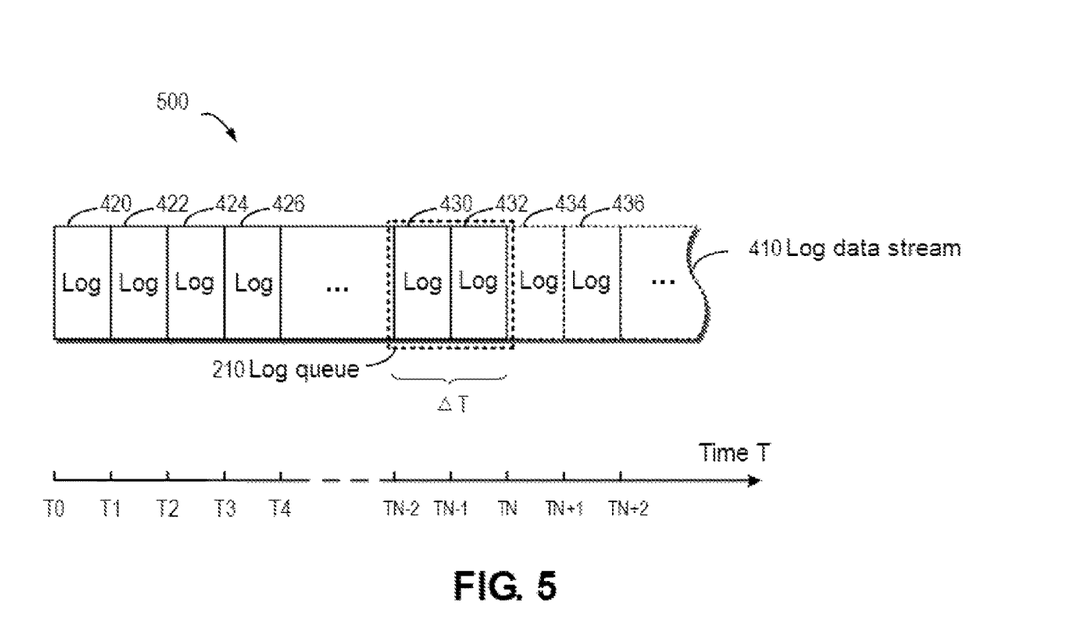
FIG. 5 schematically illustrates a block diagram of a log queue according to an example implementation of the present disclosure.

FIG. 5 schematically illustrates block diagram 500 of a log queue according to an example implementation of the present disclosure. As shown in FIG. 5, log queue 210 may include logs generated within ΔT before the current time point. Assuming that ΔT is set to 2 time units, then at current time point TN, log queue 210 may include logs 430 and 432. It will be understood that FIG. 5 only schematically illustrates a simplified example, and according to an example implementation of the present disclosure, log queue 210 can accommodate more log data. Assuming that the frequency of generating logs is 2 logs per second, and it is expected to store the log data within 30 seconds before an exception, then the length of log queue 210 at this point can be set to: 2*30=60. With an example implementation of the present disclosure, the length of log queue 210 can be flexibly determined based on the speed of generating logs and the length of time expected to be tracked.

According to an example implementation of the present disclosure, log queue 210 may be used to store log data prior to an exception. It will be appreciated that log queue 210 is only used to store log data whose level does not satisfy a predetermined level. Therefore, before writing log data to log queue 210, it should be first judged whether the log data satisfies a predetermined level. If it is determined that the level of the log data does not satisfy predetermined level 230, the log data may be added to log queue 210 of application system 110. With an example implementation of the present disclosure, log queue 210 may cache log data within a predetermined range, so as to store the cached log data to log repository 140 when an exception occurs.

It will be appreciated that log queue 210 here may be managed in a first-in-first-out manner, and only store the latest logs within time range T. If it is determined that log queue 210 exceeds a predetermined range, that is, the difference between the time of given log data at the head position of the log queue and the current time exceeds the predetermined range, the given log data is removed from log queue 210. More details of updating log queue 210 are described with reference to FIG. 5. As shown in FIG. 5, at time point TN, log queue 210 includes logs 430 and 432. At time point TN+1, the difference between the time of log 430 at the head of log queue 210 and the current time is (TN+1)−(TN−2)=3>2, so it should be removed. At this point, log 434 is added to the end of log queue 210, and log queue 210 includes logs 432 and 434 at time point TN+1. With an example implementation of the present disclosure, it can be ensured that log queue 210 always includes the most recent log data prior to the current time point that may be written to log repository 140.

It will be appreciated that the above only schematically shows a case for updating log queue 210 when the predetermined range is expressed as a predetermined time interval. When the predetermined range is expressed as a predetermined number of logs, log queue 210 may be updated when the number of logs in log queue 210 exceeds the predetermined number of logs. When the predetermined range is expressed as a predetermined capacity, log queue 210 may be updated when the capacity of log queue 210 exceeds the predetermined capacity.

According to an example implementation of the present disclosure, after the data in log queue 210 has been written to log repository 140, log queue 210 may be emptied. At this point, log queue 210 may be used to store upcoming log data. Alternatively and/or additionally, log queue 210 may not be emptied. At this point, when writing to log repository 140, the writing may be performed on an "incremental" basis. In other words, duplicate log data in log queue 210 (i.e., log data that has already been written to log repository 140) is not written to log repository 140. It will be appreciated that FIG. 5 shows the general case of log queue 210 by way of example only. In addition to the general case shown in FIG. 5, there may also be particular cases. For example, application system 110 may have an exception at first time point T0 after startup, and at this point, log queue 210 is empty. In this particular case, logs within a predetermined range at time of and after the exception may be stored to log repository 140. For another example, application system 110 may have an exception within time range ΔT after startup, and at this time, the time range of logs in log queue 210 is smaller than T. In this case, the logs in log queue 210 and logs within a predetermined range at time of and after the exception may be stored to log repository 140.

According to an example implementation of the present disclosure, log data within a predetermined time range after an exception occurs may be stored to log database 140. At this point, regardless of the level of subsequent log data, subsequent log data within a predetermined range after the target time point is stored to the log repository. It will be appreciated that the predetermined range after the target time point may or may not be the same as the predetermined range before the target time point described above. For convenience of description, the predetermined range after the target time point may be set to ΔT. According to an example implementation of the present disclosure, if application system 110 no longer generates logs (or shuts down) after the target time point, then at this point, there is no subsequent log data after the target time point.

According to an example implementation of the present disclosure, processing subsequent log data may involve two situations: the level of the subsequent log data satisfies predetermined level 230 or does not satisfy predetermined level 230. When the level of the subsequent log data satisfies predetermined level 230, the subsequent data may be regarded as new data to be processed, and method 300 described above is performed on the new data to be processed.

According to an example implementation of the present disclosure, when the level of the subsequent log data does not satisfy predetermined level 230, the distance between the log data and previous log data satisfying the predetermined level may be determined. If it is determined that the distance does not exceed a predetermined range, the log data is stored to log repository 140. In this manner, log data within time interval ΔT after an exception may be stored to log repository 140. In other words, log data within the predetermined range after an exception can be directly stored to log repository 140 without caching logs in log queue 210.

According to an example implementation of the present disclosure, if it is determined that the distance exceeds the predetermined range, it indicates that the processing on the exception that has occurred has ended. Thus, if it is determined that the distance exceeds the predetermined range, log data is added to log queue 210. At this point, log queue 210 may continue to cache potential logs that may need to be written to log repository 140 in order to perform writing when an exception occurs.

Figure 6:
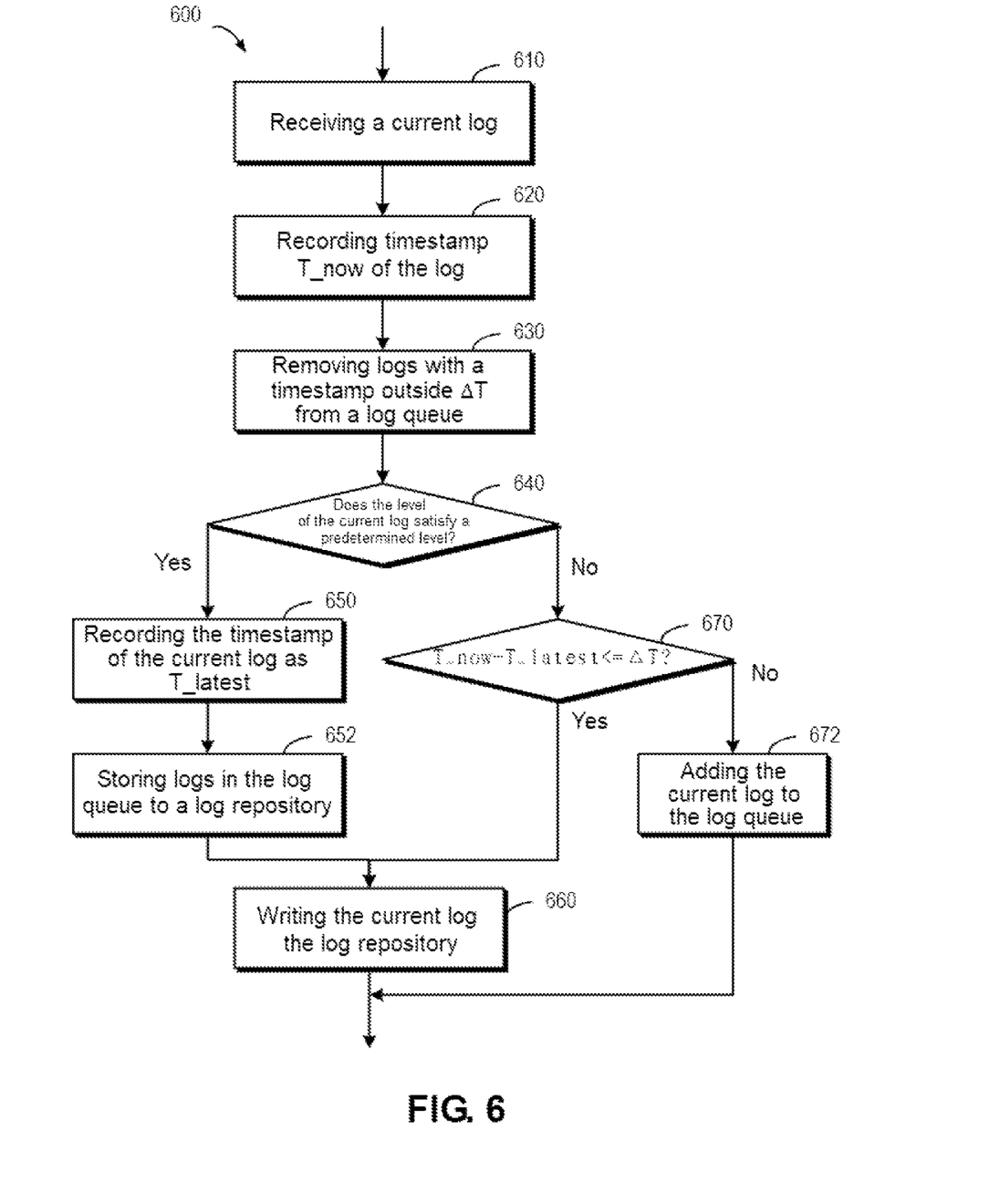
FIG. 6 schematically illustrates a flow chart of a method for managing logs according to an example implementation of the present disclosure.

Various details about managing logs have been described above. Hereinafter, the overall flow of managing logs using log queue 210 will be described with reference to FIG. 6. FIG. 6 schematically illustrates a flow chart of method 600 for managing logs according to an example implementation of the present disclosure. As shown in FIG. 6, a current log may be received at block 610. At block 620, timestamp T_now of the log may be recorded. At block 630, logs with a timestamp outside ΔT may be removed from log queue 210. In other words, log queue 210 may be updated in the first-in-first-out manner as described above.

Further, at block 640, it may be determined whether the level of the current log satisfies predetermined level 230. If the determination result is "yes," method 600 proceeds to block 650. The timestamp of the current log can be recorded as T_latest in order to represent the timestamp of the latest exception. At block 652, the logs in log queue 210 may be stored to log repository 140. In other words, this step may store logs within a predetermined range prior to an exception to log repository 140. Method 600 then proceeds to block 660 to write the current log to log repository 140. At this point, the processing on the current log ends, and log repository 140 includes logs prior to the exception (i.e., logs in the log queue) and logs of the exception (i.e., the current log).

If the determination result at block 640 is "no," method 600 proceeds to block 670 to compare the timestamp of the current log with the timestamp of the latest exception. If T_now−T_latest<=ΔT, this means that the current log is within time interval ΔT after the latest exception. At this point, method 600 proceeds to block 660 to write the current log to log repository 140. At this point, the processing on the current log ends, and log repository 140 at this point includes logs before the exception (within time interval ΔT), logs of the exception, and logs after the exception (within time interval ΔT).

If the determination result at block 670 is "no," method 600 proceeds to block 672 to add the current log to log queue 210. This step indicates that the current log is outside time interval ΔT after the exception and thus should be added to log queue 210. In other words, the logs cached by log queue 210 at this time can be used for possible exceptions in the future. When an exception occurs, the logs in log queue 210 can be directly written to log repository 140. When no exception occurs, log queue 210 can be updated in a first-in-first-out manner. According to an example implementation of the present disclosure, method 600 shown in FIG. 6 may be repeatedly performed in order to process each log subsequently received.

With an example implementation of the present disclosure, log data within a predetermined range can be pre-cached before an exception. Once an exception occurs, the cached data can be directly written to log repository 140. In this way, on the one hand, it is possible to ensure that all types of log data within a predetermined range before the exception are stored, and on the other hand, only log data related to the exception will be written to log repository 140, thereby saving the storage space of log repository 140.

Examples of the method according to the present disclosure have been described in detail above with reference to FIGS. 2 to 6, and an implementation of a corresponding apparatus will be described below. According to an example implementation of the present disclosure, an apparatus for managing log data is provided. The apparatus includes: a receiving module configured to receive log data describing the state of an application system at a target time point; a determining module configured to determine whether the level of the log data satisfies a predetermined level; a storing module configured to store, in response to determining that the level of the log data satisfies the predetermined level, log data within a predetermined range adjacent to the target time point to a log repository of the application system, the predetermined range indicating the amount of log data expected to be stored. According to an example implementation of the present disclosure, the above apparatus may further include modules for executing other steps of method 300.

Figure 7:
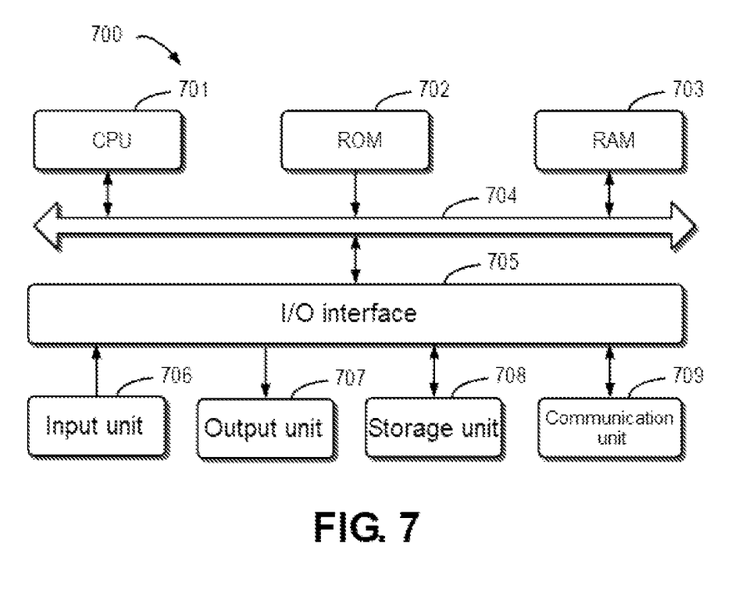
FIG. 7 schematically illustrates a block diagram of a device for managing logs according to an example implementation of the present disclosure.

FIG. 7 schematically illustrates a block diagram of device 700 for managing a storage system according to an example implementation of the present disclosure. As shown in the figure, device 700 includes central processing unit (CPU) 701 that may perform various appropriate actions and processing according to computer program instructions stored in read-only memory (ROM) 702 or computer program instructions loaded from storage unit 708 to random access memory (RAM) 703. Various programs and data required for the operation of device 700 may also be stored in RAM 703. CPU 701, ROM 702, and RAM 703 are connected to one another through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various processes and processing described above, such as method 300, may be performed by processing unit 701. For example, in some implementations, method 300 may be implemented as a computer software program that is tangibly included in a machine-readable medium, such as storage unit 708. In some implementations, part of or all the computer program may be loaded and/or installed onto device 700 via ROM 702 and/or communication unit 709. One or more steps of method 300 described above may be performed when the computer program is loaded into RAM 703 and executed by CPU 701. Alternatively, in other implementations, CPU 701 may also be configured in any other suitable manner to implement the above processes/methods.

According to an example implementation of the present disclosure, an electronic device is provided, including: at least one processor; and a memory coupled to the at least one processor and having instructions stored therein, wherein the instructions, when executed by the at least one processor, cause the device to perform actions. The actions include: receiving log data describing the state of an application system at a target time point; determining whether the level of the log data satisfies a predetermined level; and in response to determining that the level of the log data satisfies the predetermined level, storing log data within a predetermined range adjacent to the target time point to a log repository of the application system, the predetermined range indicating the amount of log data expected to be stored.

According to an example implementation of the present disclosure, the predetermined range includes a predetermined range prior to the target time point, and the actions further include: in response to determining that the level of the log data does not satisfy the predetermined level, adding the log data to a log queue of the application system, the log queue being used to store at least one piece of log data in chronological order.

According to an example implementation of the present disclosure, adding the log data to the log queue includes: determining a distance between the log data and previous log data satisfying the predetermined level; and adding the log data to the log queue in response to determining that the distance exceeds the predetermined range.

According to an example implementation of the present disclosure, the actions further include: in response to determining that the distance does not exceed the predetermined range, storing the log data to the log repository.

According to an example implementation of the present disclosure, the predetermined range includes a predetermined range after the target time point, and the actions further include: in response to determining that the level of the log data satisfies the predetermined level, storing subsequent log data within the predetermined range after the target time point to the log repository.

According to an example implementation of the present disclosure, the log data is log data in a log data stream that is used to continuously monitor the state of the application system, and the actions are executed in response to an update of the log data stream.

According to an example implementation of the present disclosure, the actions further include: in response to determining that the log queue exceeds the predetermined range, removing given log data at the head position of the log queue from the log queue.

According to an example implementation of the present disclosure, the capacity of the log queue is not lower than the predetermined range.

According to an example implementation of the present disclosure, the predetermined range includes at least any one of the following: a predetermined time interval, a predetermined number of logs, and a predetermined capacity for log data.

According to an example implementation of the present disclosure, the predetermined range is set based on at least any one of the following: the speed at which the application system generates log data, the time cycle of operations in the application system, and the capacity of the log repository.

According to an example implementation of the present disclosure, a computer program product is provided, the computer program product being tangibly stored on a non-transitory computer-readable medium and including machine-executable instructions, wherein the machine-executable instructions are used to execute the method according to the present disclosure.

According to an example implementation of the present disclosure, a computer-readable medium is provided, the computer-readable medium storing machine-executable instructions which, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/ processing device receives computer-readable program instructions from a network and forwards the computer-readable program instructions for storage in a computer-readable storage medium in the computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to a plurality of implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for managing log data, comprising:
receiving log data describing a state of an application system at a target time point;
determining whether a level of the log data satisfies a predetermined level; and
in response to determining that the level of the log data satisfies the predetermined level, storing log data within a predetermined range adjacent to the target time point to a log repository of the application system, wherein the predetermined range comprises a time interval before and a time interval after the target time point, wherein the predetermined range is set based on a time cycle of operations in the application system, the predetermined range indicating the amount of log data to be stored, wherein the log data within the time interval and before the target time point is first stored to a log queue of the application system and then stored to the log repository from the log queue, wherein the log data within the time interval and after the target time point is stored to the log repository without being stored in the log queue, and wherein the log queue is used to store at least one piece of log data in chronological order, whereby only log data whose level satisfies the predetermined level and log data within the predetermined range is stored to the log repository of the application system.

2. The method according to claim 1, wherein the method further comprises:

in response to determining that the level of the log data does not satisfy the predetermined level, adding the log data to the log queue.

3. The method according to claim 2, wherein adding the log data to the log queue comprises:
determining a distance between the log data and previous log data satisfying the predetermined level; and
adding the log data to the log queue in response to determining that the distance exceeds the predetermined range.

4. The method according to claim 3, further comprising: in response to determining that the distance does not exceed the predetermined range, storing the log data to the log repository.

5. The method according to claim 1, wherein the method further comprises: in response to determining that the level of the log data satisfies the predetermined level, storing subsequent log data within the predetermined range after the target time point to the log repository.

6. The method according to claim 1, wherein the log data is log data in a log data stream that is used to continuously monitor the state of the application system, and the method is executed in response to an update of the log data stream.

7. The method according to claim 1, further comprising: in response to determining that the log queue exceeds the predetermined range, removing given log data at a head position of the log queue from the log queue.

8. The method according to claim 1, wherein a capacity of the log queue is not lower than the predetermined range.

9. The method according to claim 1, wherein the predetermined range is further set based on a speed at which the application system generates log data and a capacity of the log repository.

10. An electronic device, comprising:
at least one processor; and
a memory coupled to the at least one processor and having instructions stored therein, wherein the instructions, when executed by the at least one processor, cause the device to perform actions comprising:
receiving log data describing a state of an application system at a target time point;
determining whether a level of the log data satisfies a predetermined level; and
in response to determining that the level of the log data satisfies the predetermined level, storing log data within a predetermined range adjacent to the target time point to a log repository of the application system, wherein the predetermined range comprises a time interval before and a time interval after the target time point, wherein the predetermined range is set based on a time cycle of operations in the application system, the predetermined range indicating the amount of log data to be stored, wherein the log data within the time interval and before the target time point is first stored to a log queue of the application system and then stored to the log repository from the log queue, wherein the log data within the time interval and after the target time point is stored to the log repository without being stored in the log queue, and wherein the log queue is used to store at least one piece of log data in chronological order, whereby only log data whose level satisfies the predetermined level and log data within the predetermined range is stored to the log repository of the application system.

11. The device according to claim 10, wherein the actions further comprise:
in response to determining that the level of the log data does not satisfy the predetermined level, adding the log data to the log queue.

12. The device according to claim 11, wherein adding the log data to the log queue comprises:
determining a distance between the log data and previous log data satisfying the predetermined level; and
adding the log data to the log queue in response to determining that the distance exceeds the predetermined range.

13. The device according to claim 12, wherein the actions further comprise: in response to determining that the distance does not exceed the predetermined range, storing the log data to the log repository.

14. The device according to claim 10, wherein the actions further comprise: in response to determining that the level of the log data satisfies the predetermined level, storing subsequent log data within the predetermined range after the target time point to the log repository.

15. The device according to claim 10, wherein the log data is log data in a log data stream that is used to continuously monitor the state of the application system, and the actions are executed in response to an update of the log data stream.

16. The device according to claim 10, wherein the actions further comprise: in response to determining that the log queue exceeds the predetermined range, removing given log data at a head position of the log queue from the log queue, and a capacity of the log queue is not lower than the predetermined range.

17. The device according to claim 10, wherein the predetermined range is set based on at least any of the following: a speed at which the application system generates log data, a time cycle of operations in the application system, and a capacity of the log repository.

18. A computer program product having a non-transitory computer readable medium which stores a set of instructions to manage log data; the set of instructions, when carried out by computerized circuitry, causing the computerized circuitry to perform a method of:
receiving log data describing a state of an application system at a target time point;
determining whether a level of the log data satisfies a predetermined level; and
in response to determining that the level of the log data satisfies the predetermined level, storing log data within a predetermined range adjacent to the target time point to a log repository of the application system, wherein the predetermined range comprises a time interval before and a time interval after the target time point, wherein the predetermined range is set based on a time cycle of operations in the application system, the predetermined range indicating the amount of log data to be stored, wherein the log data within the time interval and before the target time point is first stored to a log queue of the application system and then stored to the log repository from the log queue, wherein the log data within the time interval and after the target time point is stored to the log repository without being stored in the log queue, and wherein the log queue is used to store at least one piece of log data in chronological order, whereby only log data whose level satisfies the predetermined level and log data within the predetermined range is stored to the log repository of the application system.

19. The method according to claim 1, wherein the predetermined level is one of a plurality of levels; and wherein the log data stored in the log repository includes log data of all levels in the plurality of levels.

\* \* \* \* \*